(12) United States Patent
Shustack et al.

(10) Patent No.: US 8,557,941 B2
(45) Date of Patent: Oct. 15, 2013

(54) PHOTO OR ELECTRON BEAM CURABLE COMPOSITIONS

(75) Inventors: Paul J. Shustack, Elmira, NY (US); Kimberly S. Wayman, Elmira, NY (US)

(73) Assignee: Corning Incorporated, Corning, NY (US)

( * ) Notice: Subject to any disclaimer, the term of this patent is extended or adjusted under 35 U.S.C. 154(b) by 148 days.

(21) Appl. No.: 13/307,038

(22) Filed: Nov. 30, 2011

(65) Prior Publication Data

US 2012/0068112 A1 Mar. 22, 2012

Related U.S. Application Data (62) Division of application No. 11/292,390, filed on Nov. 30, 2005, now Pat. No. 7,799,885, and a division of application No. 12/369,895, filed on Feb. 12, 2009, now Pat. No. 8,088,877.

(51) Int. Cl.
*B32B 38/00* (2006.01)
*C08F 118/14* (2006.01)

(52) U.S. Cl.
USPC ...... 526/319; 252/183.11; 526/320; 156/278; 264/1.36; 427/162

(58) Field of Classification Search
USPC .............. 526/319, 320; 156/278; 252/183.11; 264/1.36; 427/162
See application file for complete search history.

(56) References Cited

U.S. PATENT DOCUMENTS

| | | | |
|---|---|---|---|
| 4,890,905 A | 1/1990 | Van Rosmalen et al. | 350/482 |
| 5,234,792 A | 8/1993 | Koyama et al. | 430/270 |
| 5,597,613 A | 1/1997 | Galarneau et al. | 427/162 |
| 5,648,345 A | 7/1997 | Remington et al. | 514/183 |
| 5,985,084 A | 11/1999 | Summersgill et al. | 156/273.7 |
| 6,045,953 A | 4/2000 | Ohe et al. | 430/1 |
| 6,284,072 B1 | 9/2001 | Ryan et al. | 156/59 |
| 6,306,563 B1 | 10/2001 | Xu et al. | 430/321 |
| 6,323,361 B1 | 11/2001 | Wu et al. | 560/223 |
| 6,329,482 B1 | 12/2001 | Henry | 526/260 |
| 6,368,769 B1 | 4/2002 | Ohkawa et al. | 430/270.1 |
| 6,379,861 B1 | 4/2002 | Trefonas et al. | 430/270.1 |
| 6,449,097 B1 | 9/2002 | Zhu et al. | 359/576 |
| 6,656,990 B2 | 12/2003 | Shustack et al. | 524/430 |
| 6,750,267 B2 | 6/2004 | Faust et al. | 522/31 |
| 6,810,187 B2 | 10/2004 | Fabian et al. | 385/128 |
| 6,818,680 B2 | 11/2004 | Shustack | 522/134 |
| 6,855,478 B2 | 2/2005 | Devoe et al. | 430/270.1 |
| 2003/0017581 A1 | 1/2003 | Li et al. | 435/287.2 |
| 2003/0027327 A1 | 2/2003 | Cunningham et al. | 435/287.2 |
| 2004/0184397 A1 | 9/2004 | Saito et al. | 369/275.4 |
| 2005/0070027 A1 | 3/2005 | Gollier et al. | 436/518 |
| 2005/0084613 A1 | 4/2005 | Wang et al. | 427/282 |

FOREIGN PATENT DOCUMENTS

| | | |
|---|---|---|
| EP | 0 909 752 | 4/1999 |
| JP | 2004-051790 | 2/2004 |
| JP | 2004051790 A * | 2/2004 |
| WO | WO 03/012784 | 2/2003 |

OTHER PUBLICATIONS

N. Dumbravescu et al., "Replication of Diffractive Gratings Using Embossing Into UV-Cured Photo-Polymers", Part of the SPIE Conference on Micromachine Technology for Diffractive and Holographic Optics, Santa Clara, California, Sep. 1999, SPIE vol. 2879, pp. 206-213.*

N. Dumbrăvescu et al., "Replication of Diffractive Gratings Using Embossing Into UV-Cured Photo-Polymers", Part of the SPIE Conference on Micromachine Technology for Diffractive and Holographic Optics, Santa Clara, California, Sep. 1999, SPIE vol. 2879, pp. 206-213.

M.T. Gale, "Replication Technology for Micro-Optics and Optical Microsystems", Proceedings of SPIE, vol. 5177, Gradient Index, Miniature, and Diffractive Optical Systems III, pp. 113-120.

* cited by examiner

*Primary Examiner* — Ling Choi
*Assistant Examiner* — Chun-Cheng Wang
(74) *Attorney, Agent, or Firm* — John L. Haack (57) ABSTRACT

A curable composition and a process for using the curable composition within a grating-coupled waveguide (GCW) sensor are disclosed. The composition can be used for facile replication of optical components, specifically those used in a label-independent detection system where operation of the waveguide is dependent on the detailed formation of micro and nano size patterns. The photo or electron beam curable composition has low viscosity ($\leq 500$ cPs) and cures to an optically clear material with high glass transition temperature ($\geq 70°$ C.), low shrinkage on cure, low outgassing, and low extractables.

5 Claims, 4 Drawing Sheets

PHOTO OR ELECTRON BEAM CURABLE COMPOSITIONS

CROSS-REFERENCE TO RELATED APPLICATIONS

This application is a divisional of and claims the benefit of priority to U.S. patent application Ser. No. 11/292,390, filed on Nov. 30, 2005, now U.S. Pat. No. 7,799,885, and U.S. patent application Ser. No. 12/369,895, filed on Feb. 12, 2009, now U.S. Pat. No. 8,088,877 (U.S. patent No. not yet assigned), the content of which is relied upon and incorporated herein by reference in their entirety.

FIELD OF THE INVENTION

The present invention relates generally to polymerizable compositions, and more particularly to photo or electron beam curable compositions for facile replication of micro or nano size optical components.

BACKGROUND OF THE INVENTION

Biosensors have recently become known for their ability to simultaneously quantify many different biomolecular interactions with high sensitivity. The technology has been developed to detect a variety of biomolecular complexes including oligonucleotides, antibody-antigen interactions, hormone-receptor interactions, and enzyme-substrate interactions. These tools have enormous capability for applications in pharmaceutical discovery, proteomics, and diagnostics. Further, for these tools to find widespread use, they should be applicable to a wide range of analytes that can include, for example, polynucleotides, peptides, small proteins, antibodies, and even entire cells.

Typically, the technology involves using a grating-couple waveguide (GCW) to sense a concentration change, surface adsorption, reaction, or the presence of a biological or chemical substance at the GCW surface. An optical interrogation system uses optical elements, such as a grating, to couple a light beam from a light source in and out of an optical mode in the waveguide of the GCW sensor. The angle or wavelength of the emitted light beam is detected and analyzed to determine the effective refractive index of the waveguide. Changes in the angle or wavelength of the probe light, for example, indicate changes of the waveguide effective index that result from activity at the sensor surface. In particular, GCW sensors are advantageous for use in high-throughput screening applications. When applied in the context of the microplate, the waveguide and diffraction grating of the GCW sensor are preferably located in the bottom of each well (e.g., the diffraction grating may be stamped or otherwise molded into the well bottom, and the waveguide is subsequently applied on top of the diffraction grating). Specifically, the sensor is located in the center of a bottom surface of each well.

A process for replicating the grating structures onto a glass or plastic substrate has been through the use of a UV curable material in combination with a preformed tool or mold. Two such processes are known as UV embossing (typically a dynamic process), or UV cast and cure (generally static process). In the UV embossing or cast and cure processes, a UV curable liquid material composition is dispensed or transferred onto either the substrate or the tool containing the optical features or between the substrate and the tool. Then, the composition is cured with UV radiation such that either the substrate or the tool allows transmission of the radiation. The tool and the substrate are then separated with the cured composition replicating the optical features of the tool surface and remaining adhered to the substrate.

Unfortunately, commercially available UV curable materials contain undesirable urethane(meth)acrylates, halogenated (meth)acrylates, or monofunctional acrylates. The manufacture and performance of micro and nano size optical gratings made from these acrylate materials has been poor, due to undesirable viscosity of the fabrication material and unacceptable changes in surface tension. As well, excessive shrinkage produces an undesirable warpage or distortion of the grating and/or substrate.

There remains a need in the art for three-dimensional, polymeric optical elements that can be manufactured with a high degree of precision and enhanced consistency. In order to be useful in these applications, a photo or electron beam curable composition will be especially suited for flowing into the fine micro or nano size structures of a mold/tool. In particular, the improved photocurable composition will have a low viscosity and allow for rapid, facile replication of micro or nano sized features with high fidelity. Additionally, minimal surface tension effects will allow formation of a variety of shapes and ranges of micro- or nano-size patterns onto a substrate. The improved organic optical component, fabricated using a photo or EB curable composition, will easily release from the tool and be transferred, or adhered, to the substrate, instantly replicating the micro or nano size features from the tool. Furthermore, since the waveguide coating deposition process may involve exposure of the grating material to somewhat high temperatures ($\geq 70°$ C.), it is desirable that the glass transition temperature ($T_g$) of the grating material be higher than this temperature. As well, the waveguide coating deposition process may also be done under vacuum. It is therefore desirable that the grating material not appreciably oxidize or evolve volatile material during this process. Subsequently, the cured product will be an optically clear material with minimal shrinkage, low outgassing, and low extractables. As desired, a photocurable composition and method of using the composition will be capable of satisfying these stringent requirements.

SUMMARY OF THE INVENTION

The present invention relates to a curable material for use in the formation of discrete structures. One aspect of the present invention provides an actinic radiation or electron beam curable composition suitable for use in replicating optical components. The curable composition comprises a homopolymer that cures to have a glass transition temperature of about $T_g \geq 50°$ C.; the homopolymer comprises at least one monomer including at least one di(meth)acrylate functional group, a hydrogen (H) or methyl ($CH_3$) substituent group, and at least one alicyclic ring structure. Further, the composition should be substantially free, $\leq 5\%$ by weight, of urethane (meth)acrylates, halogenated (meth)acrylates, or monofunctional (meth)acrylates.

In another aspect, the present invention provides an actinic radiation or electron beam curable composition suitable for use in replicating optical components, such that the fabricating material has a viscosity of about $\leq 500$ cPs and cures to a homopolymeric optically clear material having a transition temperature of about $T_g \geq 70°$ C.

In yet another aspect, the present invention provides a transparent substrate having optical features comprising a monomeric composition including at least one di(meth)acrylate and at least one alicyclic ring structure; in which the composition is curable and utilized in replicating optical gratings onto a bottom surface of the multi-well plate. One aspect of a multi-well plate/microplate of the present invention includes a multiplicity of wells including gratings with a photocurable composition of the present invention in addition to a high refractive index material coated on the grating.

Therefore, another aspect of the present invention includes a process for replicating optical gratings comprising steps of: providing a substrate and a tool in which the tool includes one or more optical features, introducing a layer of the curable composition of the present invention onto the substrate or the tool (or between the substrate and the tool), exposing the curable composition to actinic radiation, such that the substrate or the tool, or both, allow transmission of at least some of the radiation so that a partially cured composition is formed, separating the substrate and the tool so that the partially cured composition having replicated optical features from a tool surface adheres to the substrate, and exposing the partially cured composition to further actinic radiation so as to fully cure or solidify the composition, or cure the composition to the desired consistency.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, exemplary embodiments disclosing specific details are set forth in order to provide a thorough understanding of the present invention. However, it will be apparent to one having ordinary skill in the art that the present invention may be practiced in other embodiments that depart from the specific details disclosed herein. In other instances, detailed descriptions of well-known devices and methods may be omitted so as not to obscure the description of the present invention.

Figure 1:
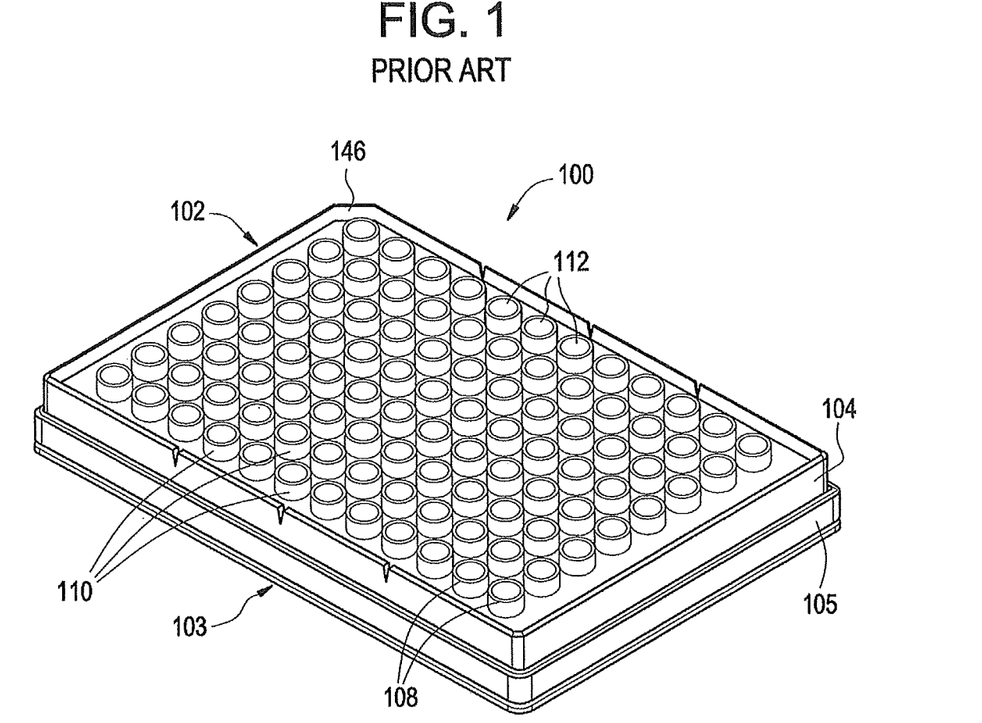
FIG. 1 (PRIOR ART) is a perspective view of a microplate having an array of wells.
Figure 1A:
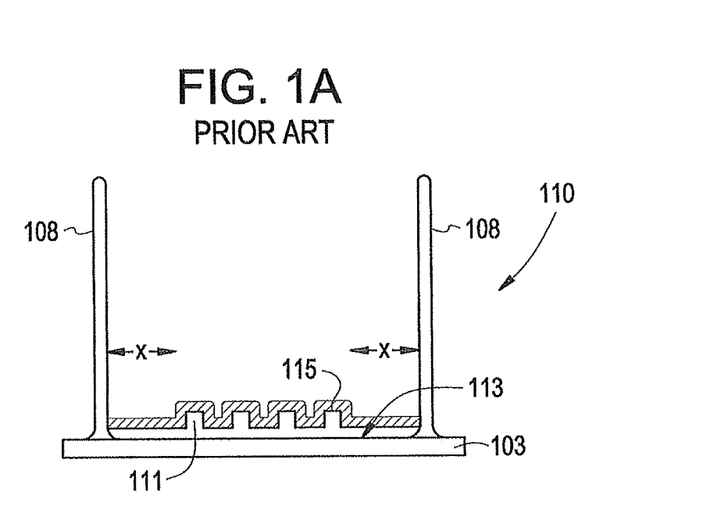
FIG. 1A (PRIOR ART) is a cut-away cross-section of a typical well from a microplate.

The composition of the present invention was specifically developed to be used to make optical gratings on the bottom of each microwell of label independent detection (LID) microwell plates. A prior art microplate 100 as shown in FIG. 1 includes an array of wells 110 with ends 112 having openings facing upward. The multiwell plate 100 is typically of two-part construction including an upper plate 102 (an injection molded plastic body, or so-called "holey" plate 102), and a lower plate/substrate 103. The upper plate 102 includes a frame 104 surrounded by a skirt 105, peripheral to the wells 110. Common sizes for multiwell plates 100 include matrices of 96, 384, and/or 1536 wells to accommodate automated equipment in industry. The standard plate 100, however, may include any number of wells 110. In addition, sidewalls 108 define each well within the array of wells 110, each well 110 capable of receiving an aliquot of sample to be assayed. The substrate 103 then forms a substantially and preferably flat transparent bottom surface 113 (as can be seen in FIG. 1A) for each sample well 110. Depending on the application, the substrate 103 may be glass, ceramic, or polymer.

For LID applications, the bottom surface 113 within each sample well further includes an optical component, sensor or grating configuration 111 coated with a dielectric layer 115. The optical grating 111 is preferentially located in the center of the bottom glass surface 113 inside each well 110. Detection equipment preferably has direct access to the underside of the microplate 100 such that analysis may be performed on the array of wells 110. The detector or other analytical equipment can detect activity occurring within the wells 110, or alternatively, on the bottom surface 113 of the well 110. In a preferred embodiment, a corner 146 is notched to facilitate placement into analytical instrumentation mounts.

A curable composition for purposes of the present invention shall relate to a polymeric material or mixture of materials that may be cross-linked by exposure to electron beam particles, thermal energy, or electromagnetic radiation.

The present invention relates to a photo or electron beam curable composition 205 (See FIG. 2) comprising at least one monomer that contains at least two (meth)acrylate functional groups per molecule:

in which n≥2, and X is a hydrogen or a methyl group; R includes at least one alicyclic ring structure; and cures to a homopolymer with a glass transition temperature of about $T_g \geq 50°$ C. (as measured from the peak of the tan δ curve from dynamic mechanical analysis (DMA). Further, the composition should be substantially free, ≤5% by weight, of urethane (meth)acrylates, halogenated (meth)acrylates, or monofunctional (meth)acrylates.

It is preferred that this monomer be present at ≥20% level, more preferably ≥35% level, and most preferably ≥50% level. Examples of this monomer are, but not limited to: 1,4-cyclohexane dimethanol di(meth)acrylate, hydrogenated bisphenol A di(meth)acrylate, tricyclodecane dimethanol di(meth)

acrylate, di(meth)acrylate of hydroxyl pivaldehyde modified trimethylolpropane, and limonene alcohol di(meth)acrylate.

The composition 205 can contain other ingredients that are copolymerizable with the multifunctional alicyclic ring containing material, the homopolymer or monomer, but the composition 205 should be substantially free (≤5%) of urethane (meth)acrylates, halogenated (meth)acrylates, and monofunctional (meth)acrylates. In one embodiment, R is specifically a bi-cyclic compound utilized in the composition of the present invention. For ultraviolet (UV) cure systems, the composition should also contain a photoinitiator substituent. This can be any of the commonly used, commercially available photoinitiators.

Figure 2:
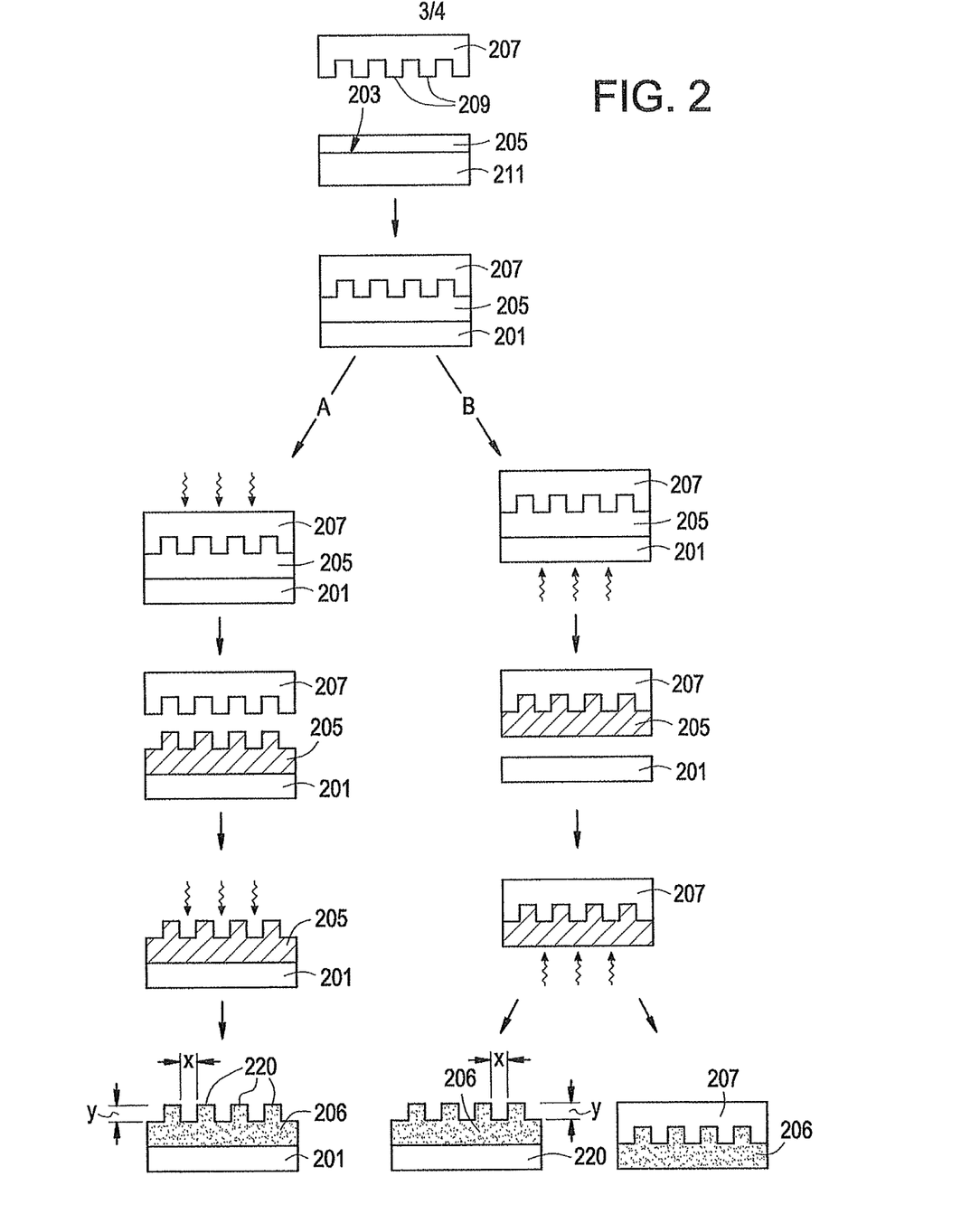
FIG. 2A is an illustrative process for creating optical components from a master tool onto a substrate.
FIG. 2B is an illustrative process for creating optical component replicas onto an upper tool.

As shown in FIG. 2, the composition 205, curable by photo or electron beam (EB) radiation, allows for rapid, facile replication of micro or nano size features with high fidelity. The composition 205 also allows for consistent replication of the features 209 from a tool 207 onto glass or plastic plates 103 such as those commonly used in pharmaceutical research and industry.

Two exemplary processes, such as ultraviolet (UV) cast and cure, and UV dynamic embossing, use the composition 205 of the present invention to fabricate gratings 206 from a tool 207. For both of these techniques, it is desirable that the material have low viscosity (≤500 cPs (centipoise)). The low viscosity facilitates the flow of material into the fine structure of the tooling. Also, the low viscosity lowers the time necessary for the material to flow out across the entire tool surface, thus lowering manufacturing time. In addition, low viscosity facilitates bubble release.

In particular, the composition 205 of the present invention was distinctively developed to be used to make the micro and nano size optical gratings 206 on the bottom of each well 110 of a multiwell plate 100. Using a synthetic quartz tool 207, an optical grating pattern 209 is replicated onto a bottom surface 203 of a substrate 201. In particular, the composition 205 has properties including low viscosity (≤500 cPs), low outgassing, and low extractables that allow replication of a micro or nano size optical grating pattern 209 from a tool 207 onto a bottom of each well 110. Selecting a fabricating material 205 that also has a low shrinkage on cure for the micro- or nano-fabrication process ensures a minimal distortion between the micro-/nano-features 209 of the tool 207 and the micro-/nano-structure of the fabricated grating 206. As a result, the grating material 205 may be applied and cured across the entire surface 203 of the glass substrate 201.

One process for replication of optical features onto a glass or plastic plate 201 is shown in FIG. 2A. When the fabricating material 205, having a low viscosity of about ≤500 cPs, is placed on the substrate 201, the tool 207, or between substrate 201 and the tool 207, the features 209 of the tool 207 are introduced into the curable composition 205. The material 205 freely flows across the substrate 201 and into the micro or nano size features 209 of the tool 207. Once the substrate 201 and the tool 207 are positioned, photo or electron beam radiation is utilized to partially cure the composition 205. To facilitate this step, the master tool 207, or the substrate 201 itself, must be transparent enough to permit transmission of at least some of the radiation from a photo or electron beam source. By conducting a partial UV cure on the grating material 205, the material 205 is cured enough to retain the micro or nanostructure 209 of the tool 207 and still maintain a flexibility enough to facilitate release. The partially cured composition 205 having corresponding replicated grating features 210 from the tool surface 209 is then exposed to additional photo or electron beam, and/or thermal radiation (e.g. a second, high dose UV cure), potentially fully curing the grating composition 205. When cured, the optically clear material 206 releases from the tool 207 and adheres to a substrate 201. Preferably, the material 206 is transparent to about 830 nm light, and has a high glass transition temperature of about a $T_g \geq 70°$ C., and even more preferably to about a $T_g \geq 75°$ C. As well, the fabricated optical grating 206 has a periodic structure of about 500 nm pitch (x), preferably between about 200-500 nm pitch or less than about 200 nm pitch, about 50% duty cycle, and about 50 nm depth (y). The cured composition 206 further has a thermogravimetric analysis (TGA) volatiles content of about ≤1% (See Table 1). Thus, high fidelity optical component replication is accomplished using a master tool 207 having submicron diffractive pattern feature sizes 209 in a photopolymeric grating composition 205.

Since the above grating fabrication process requires a facile and clean release of the cured material from a tool, the designated substrate 201 or tool 207 may be pre-coated with an adhesive, adhesion promoter or primer layer for adherence of the composition 205. For exemplification purposes only, the adhesive is an organofunctional silane. As such, the organofunctional silane, or another adhesion promoter, is applied to the substrate 201 to facilitate release of the composition 205 to the substrate 201 when the tool 207 and the substrate 201 are separated.

Adhesion promoters in the formulation, or incorporated into the composition, can also be effective but are less desirable. However, release agents added to the formulation or applied to the tooling are even less desirable because they can transfer to the grating material and negatively affect the adhesion of the waveguide coating.

When an adhesion promoter is applied to the tool 207, however, the material 205 remains adhered to the tool 207 (See FIG. 2B). A partial UV cure allows the composition 205 to be cured to some extent so that the micro or nanostructure 209 from the tool 207 is retained. Thereafter, the optical component composition 205 may be additionally cured on the tool 207 or may be transferred to a substrate 220 for further curing. Preferably, the incomplete cure will permit some flexibility of the grating material 205 to facilitate transfer of the grating material 205 to a substrate 220. Furthermore, the photo or electron beam radiation may come from a source on an alternate side of the substrate 201 or tool 207, so long as the radiation is transmissible to cure the composition 205.

Figure 3:
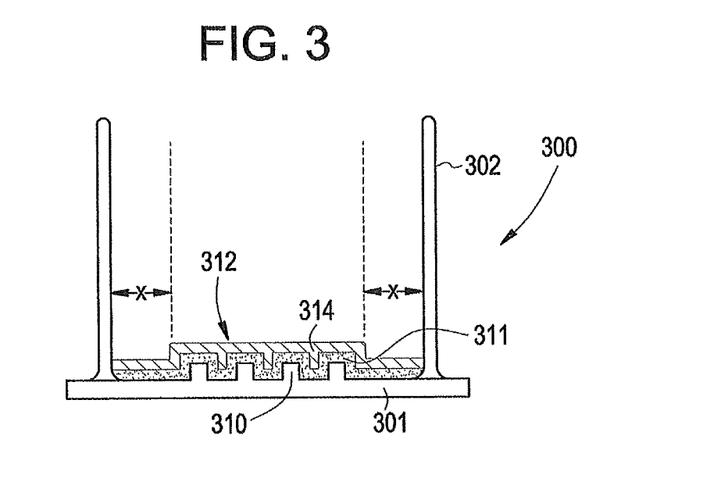
FIG. 3 illustrates a partial side-view of a sample well of the present invention having a waveguide coating applied to a centered optical component.

As shown in FIG. 3, a representative side-view illustrates an optical component 310 incorporated in a bottom surface 312 of a microwell 300. In this embodiment of the present invention, the gratings 310 are fabricated onto a glass plate 301, and oriented such that when the glass plate 301 is attached to the holey plate 302, the gratings 310 are centered in each well 300. A dielectric, high refractive index metal or inorganic material 311 is applied (as known by those skilled in the art) to all the gratings 310 on the glass plate 301 before the bottom plate 301 is bonded to the holey plate 302. Exemplary coatings that serve as an optical waveguide 311 include $Nb_2O_5$ or $Ta_2O_5$.

Preferentially, the gratings 310 are vapor deposited or sputtered with the high refractive index waveguide material 311 at a thickness of about 150 nm. Therefore, the grating 310 is unaffected (or minimally affected) by the coating process. Since the waveguide deposition process may involve exposure of the grating material 310 to somewhat high temperatures (≥70° C.), it is desirable that the glass transition temperature ($T_g$) of the grating material 310 be higher than this temperature. The waveguide coating deposition process may also be done under vacuum. Likewise, it is desirable that the grating material 310 not appreciably oxidize or evolve volatile material during this process.

Typically a chemical coating 314 is applied on top of the waveguide 311 to enable attachment of a biomolecule. One example of such a coating is an organofunctional silane layer 314. In one embodiment, the waveguide 311 can be coated with an organofunctional silane layer 314 and then, possibly, other bio/chemically reactive coating layers. These coatings, however, can be applied either before or after the plates are assembled and bonded. It is important to keep in mind, though, that both the waveguide coating and the biochemical coatings can be negatively affected by materials that can volatilize or are extractable from the grating polymer 310.

In another embodiment of the present invention, it is preferred that the gratings 410 (FIG. 4) be fabricated to cover substantially an entire bottom surface 420 of each well 422 of a microplate 400. The lower plate 401 includes the raised grating area 412 where micro to nano size optical features/ gratings 410 are cured or embossed, and further defines an analytical area, or assay platform 412 of a well 422. The assay platforms 412 including the oversized grating 410, further assist in assembly of the upper plate 402 and substrate 401 of a microplate 400. Since the grating 410 no longer has a requirement to be placed in the center of a well 422 (for previous requirements in consideration of alignment with optical instrumentation), the grating 410 can accommodate placement of a microplate 400 into analytical instrumentation, minimizing any adjustments that were previously necessary. As well, the gratings 410 also enhance intra-well referencing.

Figure 4:
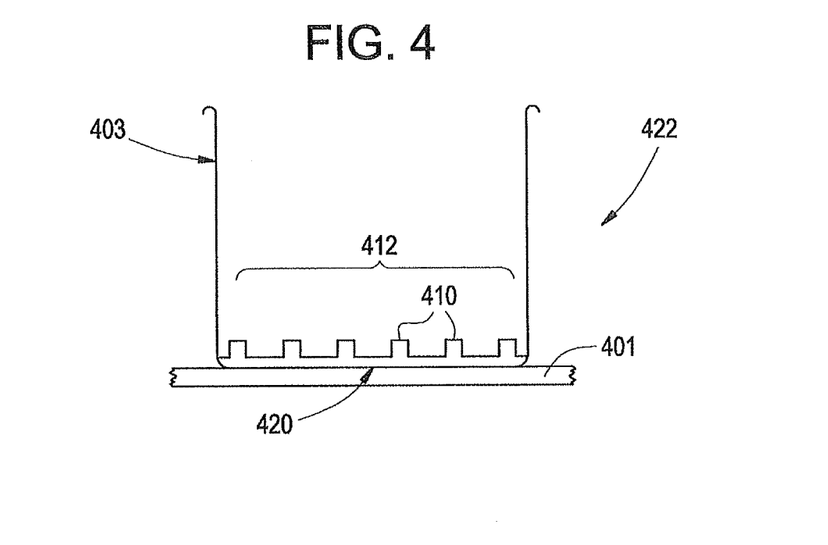
FIG. 4 illustrates a partial side-view of an oversized grating on substantially all of a bottom surface of a well of the present invention.

Furthermore, another aspect of the present invention and contributory to grating 410 fabrication, the assay platforms 412 may include various modifications so as to construct bottom surfaces 412 of a well 422 that prevent light from an adjacent or neighboring well from interfering with the analysis in another individual sample region or well. Preferably, the grating 410 covers the entire bottom surface of each well.

When a substrate 401 is assembled with an upper/holey plate 402, multiple microwells 422 are formed, each having a bottom surface 420. As illustrated in an underside view of a microplate in FIG. 4A, the gratings 412 are fabricated as a grid [pattern] on the substrate 401. In this embodiment, substantially all of the bottom surface 420 is a grating 410. Thereafter, when assembling the upper plate 402 with the substrate 401, a sidewall 403 of a well 422 contacts the grid. Consequently, the gratings 410 are capable of assisting in assembly of the microplate 400. At least one grating 410 designates a position for adhering the array of apertures 402 to the substrate. The position designated may be a point of contact on the grating 410 or a region tangential to the grating 410.

Figure 4A:
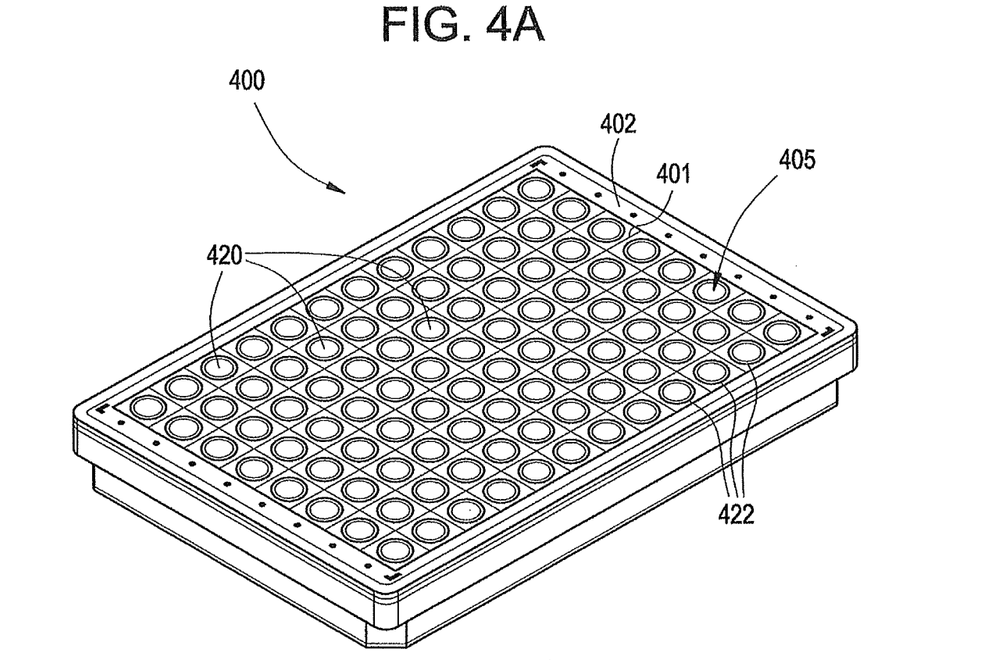
FIG. 4A illustrates an underside view of the grid of optical components on a microplate of the present invention.

The process of manufacturing a microplate 400 such that the optical gratings 410 cover substantially all of the bottom surface 420 includes fabricating the substrate 401 to have an array of gratings 410 such that each grating 410 has a defined parameter/periphery 405. The fabrication of the substrate 401 typically includes UV cast and cure techniques or UV embossing, though any method known in the art of producing gratings may be utilized with the composition of the present invention in order to create micro or nano size optical features. The sidewalls 403 of the well 422 may be positioned within a grating region 410, in contact with a periphery 405 of the grating 410 and/or region tangential to the grating 410. Subsequently, the gratings 410 are coated with a high refractive index material before attachment of the substrate 401 to the upper plate 402 so that a bottom surface 412 and the sidewalls 403 of each aperture define a well 422, and the well 422 is within the parameter 405 of the grating 410. Therefore, when the grating regions 410 of the microplate 400 are positioned in reference to a detector or other instrumentation, additional adjustments/alignments are minimal.

As discussed previously, the composition used in the above exemplary embodiments is designed to assist in the fabrication of micro and nano size optical components in a microarray format. Various substrates may include a multitude of polymeric materials or glass compositions. Additionally, the microplates including micro or nano size gratings fabricated using the composition of the present invention ensure reproducible, consistent results when utilized to simultaneously quantify many different biomolecular interactions in pharmaceutical research and development, proteomics, and diagnostics.

The invention, however, is not limited to compositions specifically designed for replication of microplate optical grating patterns. One of skill in the art would appreciate that the composition and methods disclosed herein may be employed in any instance where a nanostructure feature is selected for fabrication and replication. The curable composition of the present invention would be applicable to various methods of replicating micro and nano size features, (e.g., micro-reactors, imaging or printing applications, optical waveguide fabrication, etc.) The invention being thus described, it would be obvious that the same may be varied in many ways by one of ordinary skill in the art having had the benefit of the present disclosure. Such variations are not regarded as a departure from the spirit and scope of the invention, and such modifications as would be obvious to one skilled in the art are intended to be included within the scope of the following claims and their legal equivalents.

EXAMPLES

The following examples illustrate the invention. Compositions from Table 1 were prepared by weighing the monomers and initiators into a 50 mL cylindrical reaction flask. The reaction flask top was applied and a 6 mm diameter glass stirring shaft with a Teflon mixing blade attached. The reaction flask was immersed into a 60° C. oil bath and mixed at 600 rpm for 15 minutes. The flask was removed from the oil bath and allowed to cool to room temperature. With the mixer at 300 rpm, the Ebecryl 170 adhesion promoter and the A0397 were added to the vortex of the mix via micropipets. Mixing continued for 5 minutes; then the compositions were transferred to glass vials and allowed to set until free of bubbles.

TGA volatiles samples were prepared from these compositions by drawing down 5 mil thick films using a Bird applicator onto 4"×4"×1 mm thick glass plates. The films were UV cured under nitrogen with 2 passes under a Fusion Systems Model P300M D Lamp at 2 J/cm$^2$ UV dose (as measured with an International Light Model IL390A Radiometer) per pass. The films were removed from the glass and allowed to set at least 16 hours under ambient laboratory conditions before measuring.

Circular TGA volatiles samples (~4 mm diameter) were cut from the films using a cork borer or other similar tool. The samples were placed into a Seiko Instruments TG/DTA Model 220 TGA instrument and run under nitrogen at 200 cc/min flow rate. The temperature program was to heat from 20 to 125° C. at 10° C./minute then hold at 125° C. for 62 minutes.

Tg measurements were made on a Seiko DMS-200 dynamic mechanical analyzer. Samples (~10 mm wide×~11 mm long) were cut with a razor blade from the above prepared films and run in air at 1 Hz frequency.

Viscosity measurements were made at 25° C. using a Brookfield HBT cone and plate viscometer with a CP41 cone, 2 mL sample, and a 100 sec⁻¹ shear rate.

Example Compositions and Comparative Example Compositions are shown in Table 1 along with their TGA volatiles and Tg results. Table 2 shows the chemical names and vendors for the ingredients in Table 1. Note that the TGA volatiles results for Example a through f all are ≤1% and the Comparative Examples g through m are ≥1% except h which contains the undesirable urethane acrylate, Photomer 6891. All of the other Comparative Examples either contain the undesirable urethane(meth)acrylate or monofunctional (meth)acrylate ingredients. Although Comparative Example h passes the TGA volatiles specification, it is an undesirable composition due to its high viscosity (1500 cPs).

Example A is a particularly advantageous composition especially when used over a glass substrate that has been primed with an adhesion promoter. Almost any material that can be applied to glass that enhances the adhesion of UV curable coatings to the glass will work. Examples of these are, but not limited to: (meth)acrylated acids, acid or anhydride functional polymers, silanes, titanates, zirconates, etc. Preferred primers are silanes with organofunctional groups that will chemically react with the free radical polymerizing, UV curable Example Compositions during cure. Particularly preferred primers are 3-acryloxypropyltrichlorosilane and 3-acryloxypropyltrimethoxysilane. These can be applied to the glass by wiping, spin coating, dipping, vapor priming, etc. Examples d, e, and f contain the adhesion promoters Ebecryl 170 and A0397 and thus do not require a separate glass priming step.

TABLE 1

| | Examples | | | | | | | | | | | | | |
| | | | | | | | Comparative Examples | | | | | | | |
| Ingredient | a | b | c | d | e | f | g | h | i | j | k | l | m | n |
|---|---|---|---|---|---|---|---|---|---|---|---|---|---|---|
| Kayarad R-684 | 90 | 91.14 | 91.57 | 50 | | | 50 | 50 | 50 | 50 | 50 | 50 | 50 | 50 |
| Photomer 4127 | 8 | 8 | 8 | | | | | | | | | | | |
| CN152 | | | | | | | 25 | | 44 | | | | | |
| Actilane 411 | | | | | | | 19 | | | | 44 | | | |
| Photomer 6891 | | | | | | | | 44 | | | | | | |
| Genomer 1122 | | | | | | | | | | 44 | | | | |
| CN131B | | | | | | | | | | | | 44 | | |
| DCPOEA | | | | | | | | | | | | | 44 | |
| Kayarad R-604 | | | | 44 | 94 | 96 | | | | | | | | |
| Aronix TO-1429 | | | | | | | | | | | | | | 44 |
| Esacure KIP | | | | 1 | 1 | | 1 | 1 | 1 | 1 | 1 | 1 | 1 | 1 |
| Irgacure 819 | | 0.86 | 0.43 | 1 | 1 | 1 | 1 | 1 | 1 | 1 | 1 | 1 | 1 | 1 |
| Irgacure 1850 | 2 | | | | | | | | | | | | | |
| A0397 | | | | 3 | 3 | 2 | 3 | 3 | 3 | 3 | 3 | 3 | 3 | 3 |
| Ebecryl 170 | | | | 1 | 1 | 1 | 1 | 1 | 1 | 1 | 1 | 1 | 1 | 1 |
| TGA Volatiles (%) | 0.38 | 0.67 | 0.70 | 0.80 | 0.91 | 0.87 | 1.16 | 0.77 | 1.88 | 1.27 | 1.02 | 2.28 | 1.04 | 1.24 |
| Viscosity (cPs) | 110 | — | — | — | 235 | — | 98 | 1500 | — | — | — | — | — | — |
| Glass Transition Temp. (° C.) | 139 | — | — | — | 165 | — | 127 | 91 | — | — | — | — | — | — |

TABLE 2

Ingredient Chemical Names and Vendors

| Ingredient | Chemical Name | Vendor |
|---|---|---|
| Kayarad R-684 | Tricyclodecane dimethanol diacrylate | Nippon Kayaku Co., Tokyo, Japan |
| Photomer 4127 | Neopentyl glycol propoxylate diacrylate | Cognis Corp., Ambler, PA |
| CN152 | Low viscosity monoacrylate oligomer | Sartomer Company Inc., Exton, PA |
| Actilane 411 | Cyclic trimethylolpropane formal acrylate | Akros Chemicals America, New Brunswick, NJ |
| Photomer 6891 | Aliphatic urethane acrylate | Cognis Corp., Ambler, PA |
| Genomer 1122 | Aliphatic urethane acrylate | Rahn USA Corp., Aurora, IL |
| CN131B | Low viscosity acrylic oligomer | Sartomer Company Inc., Exton, PA |
| DCPOEA | Ethylene glycol dicyclopentenyl ether acrylate | Sigma Aldrich Co., Milwaukee, WI |
| Kayarad R-604 | Diacrylate of hydroxypivalaldehyde modified trimethylolpropane | Nippon Kayaku Co., Tokyo, Japan |
| Aronix TO-1429 | N-Acryloyloxyethyl hexahydrophthalimide | Toagosei Co., Tokyo, Japan |
| Esacure KIP | Oligo[2-hydroxy-2-methyl-1-[4-(1-methylvinyl)phenyl]propanone] | Lamberti USA Inc., White Plains, NY |

TABLE 2-continued

Ingredient Chemical Names and Vendors

| Ingredient | Chemical Name | Vendor |
| --- | --- | --- |
| Irgacure 819 | Bis(2,4,6-trimethylbenzoyl)-phenylphosphineoxide | Ciba Specialty Chemicals Inc., Tarrytown, NY |
| Irgacure 1850 | Mixture of 50% Bis(2,6-dimethoxybenzoyl)2,4,4-trimethyl-pentylphosphineoxide and 50% 1-Hydroxy-cyclohexyl-phenyl-ketone | Ciba Specialty Chemicals Inc., Tarrytown, NY |
| A0397 | 3-Acryloxypropyltrimethoxysilane | United Chemical Technologies Inc., Bristol, PA |
| Ebecryl 170 | Acrylated acidic adhesion promoter | Cytec Surface Specialties Inc., West Paterson, NJ |

We claim:

1. A process for replicating optical gratings which comprises the steps of:
providing a substrate and a tool, the tool including one or more optical features;
introducing a layer of a curable composition comprising:
a diacrylate monomer mixture comprised of:
a first diacrylate monomer of the formula:

wherein n=2; X is a hydrogen or a methyl group; R includes at least one alicyclic ring structure;
a second diacrylate monomer of a neopentyl glycol propoxylated diacrylate monomer; and the composition being substantially free of monofunctional acrylates onto the substrate or the tool, or between the substrate and the tool;
exposing the curable composition to actinic radiation, the substrate or the tool allowing transmission of at least some of the radiation to form a partially cured composition;
separating the substrate and the tool, the partially cured composition replicating the optical features of a tool surface and adhering to the substrate; and
exposing the partially cured composition to further actinic radiation.

2. A process for manufacturing a microplate, each well of the microplate having a bottom surface, substantially all of the bottom surface including a grating, wherein the process includes:
fabricating a substrate to have an array of gratings across an entire bottom surface, each grating having a defined parameter;
coating the gratings with a high refractive index material; and
adhering an array of apertures to the bottom surface to form an array of wells, at least one well within or tangential to the parameter of the grating.

3. The process of claim 2, further including a step of applying at least one organofunctional silane layer to the coated gratings.

4. An actinic radiation or electron beam curable composition suitable for use in replicating optical components, comprising a fabricating material having
a diacrylate monomer mixture comprised of:
a first diacrylate monomer of the formula:

wherein n=2; X is a hydrogen or a methyl group; R includes at least one alicyclic ring structure;
a second diacrylate monomer of a neopentyl glycol propoxylated diacrylate monomer, and
the fabricating material having a viscosity of about ≤500 cPs and cures to a optically clear material having a transition temperature of about $T_g \geq 70°$ C.

5. A grating including the polymer composition from polymerizing the curable composition of claim 4, having one or more of the following, including a periodic structure of 500 nm pitch, 50% duty cycle, 50 nm depth, and transparency to about 830 nm light.

* * * * *